Feb. 2, 1971 S. HOPKINS 3,559,218
SLUDGE EXTRACTOR FOR HOME WASTE DISPOSALS
Filed June 26, 1968 2 Sheets-Sheet 1

INVENTOR
STEPHEN HOPKINS

BY

ATTORNEY

INVENTOR
STEPHEN HOPKINS

BY

ATTORNEY

United States Patent Office 3,559,218
Patented Feb. 2, 1971

3,559,218
SLUDGE EXTRACTOR FOR HOME WASTE DISPOSALS
Stephen Hopkins, Glenn Echo Heights, Md., assignor to Hopkins Science and Research Corporation, Washington, D.C.
Filed June 26, 1968, Ser. No. 740,274
Int. Cl. B02c 18/42
U.S. Cl. 4—187          9 Claims

ABSTRACT OF THE DISCLOSURE

A centrifuge extractor for use with a waste disposal, such as might be used in a home, to remove sludge from the disposal discharged to the drainage system. The extractor unit is provided with compact arrangement for placement along with such a waste disposal beneath a kitchen sink and is adapted to retain sludge particles above a minimum size without incurring clogging of the extractor unit.

Figure 1:
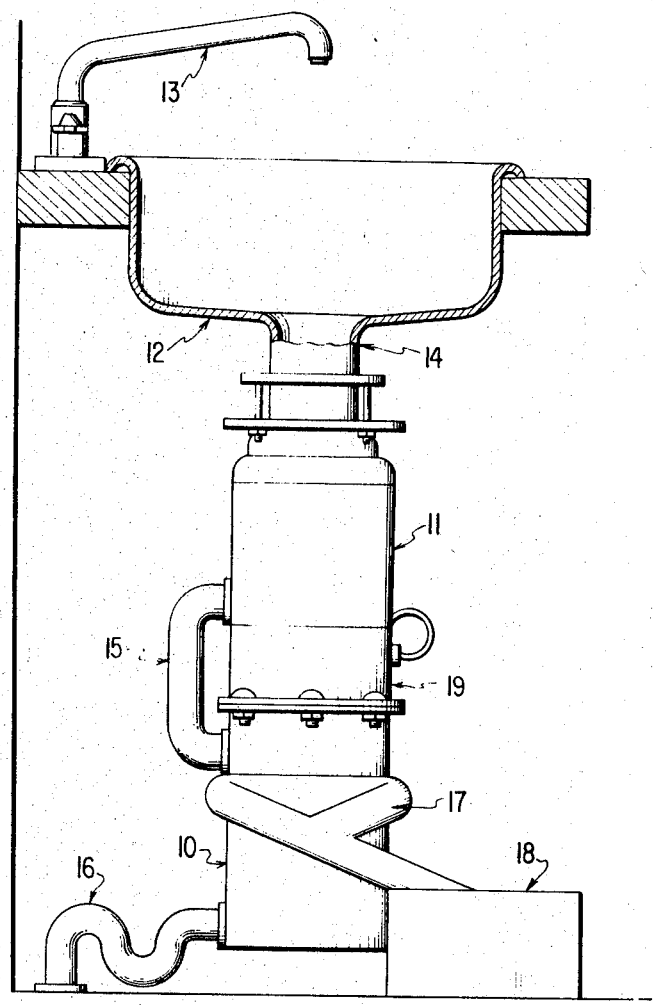

This invention relates to apparatus for use in removing sludge from a drainage system and more particularly to such apparatus adapted to remove sludge from the slurry discharge of a home waste disposal.

Waste disposals are widely used in many homes to relieve the user of the task of removing garbage and bulky trash from the home. Such disposal units are commonly placed under a kitchen sink to receive waste through the sink drain for comminution to form a slurry that is then discharged into the drainage system. However, in some particularly heavily populated areas, the use of such disposal is restricted because of the heavy demand they place upon the drainage and sewage systems of the area. This same problem exists in rural and some suburban areas which do not have municipal sewage systems and where the use of a waste disposal would place an undue demand upon the individual septic tanks employed by the various dwelling and other buildings.

When the use of waste disposal is restricted for the reasons described above, such waste must nevertheless be removed and this is usually accomplished by placing the waste in trash cans or other containers for physical removal to an incinerator. Such waste is not very compact with the result that such containers are usually quite bulky and one encounters the very problem that waste disposal was designed to overcome.

In such areas, and even in areas where there are no restrictions on the use of the sewage system, many establishments such as restaurants and also industrial concerns have used devices to remove sludge from drainage system after comminution of waste. However, the very nature of such establishments requires that such comminution and removal devices be adapted to accommodate large amounts of waste and therefore such devices are quite large and cumbersome and not adaptable for use in a family kitchen of a moderate size such as exists in most homes.

Waste disposals which are adapted for home use are commonly of a rotary type driven through a central shaft. A plurality of blades or teeth are mounted to this shaft for rotation and a second plurality of such blades or teeth are fixed within the disposal housing. The latter are aligned with rotary blades for cooperation therewith for comminution of waste supplied to the disposal with a liquid carrier. The resulting slurry formed of the comminuted waste particles and liquid carrier is then discharged into a drainage or sewage system.

The present invention is adapted for compact arrangement with such a disposal for removal of the comminuted waste in the form of a sludge that is easier to handle than bulk waste and which may be transferred to a collection unit or system such as described in my U.S. Pat. No. 3,353,478, issued Nov. 21, 1967. Other collection systems may be employed.

It is, then, an object of the present invention to provide improved apparatus for the removal of waste products.

It is another object of the present invention to provide improved apparatus for employment with the waste disposal to remove sludge from the drainage system.

It is still another object of the present invention to provide a compact waste disposal system that does not discharge unwanted amounts of sludge into the drainage system.

It is still a further object of the present invention to provide a sludge extractor for a home waste disposal unit that will retain sludge particles greater than a minimum size and yet will not become clogged.

With the sludge extraction unit of the present invention, the advantages of the home waste disposal are retained with the comminution of the waste providing a reduction in its bulk. Yet, the sludge thus formed is not discharged into the sewage or drainage systems, but is extracted from the slurry discharge of the disposal and may then be placed in a container which because of the compact form of the removed sludge need not be excessively bulky or hard to handle. Furthermore reduction of the water content of the waste lessens a tendency for spoilage.

Thus, a feature of the present invention resides in a centrifuge extractor adapted to be mounted with and to receive the slurry discharge from a home waste disposal and to remove the sludge therefrom while passing a liquid carrier into a drainage system. The waste disposal is of a rotary comminuting type and the centrifuge and the disposal are arranged to have a common axis of rotation as well as a common driving shift and driving source.

Another feature of the present invention resides in the provision of a helical conveyor blade mounted within the centrifuge and adapted to have a rotational speed slightly different from that of the centrifuge so as to move the extracted sludge out of the centrifuge and to ports designed to receive the sludge. The outer wall of the centrifuge is provided with apertures that taper inwardly with the smaller diameter thereof being just large enough to pass inconsequential sludge particles while retaining larger size particles and the helical conveyor blade is also provided with a taper extending inwardly toward the axis of rotation, the taper being at the same angle as that of the respective apertures. The blade is urged into sliding contact with centrifuge to provide a shearing effect on sludge particles that might clog the centrifuge.

Figure 3:
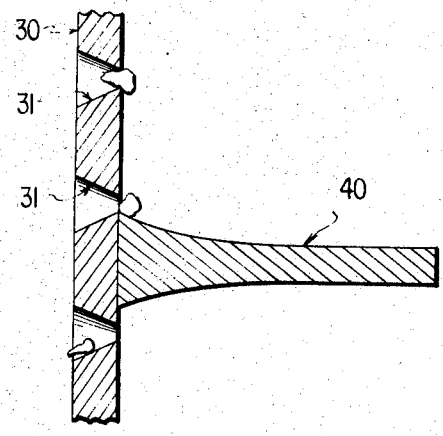
Figure 2:
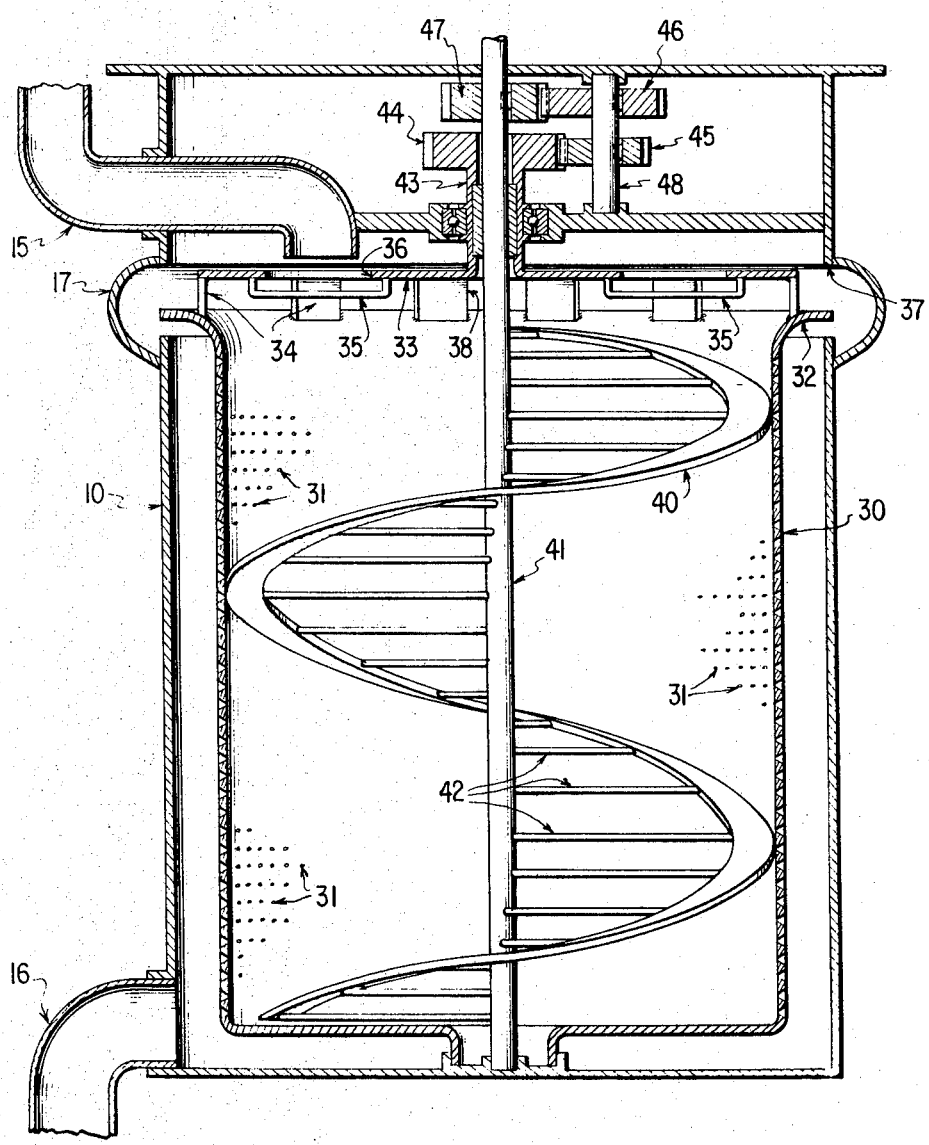

These and other objects, advantages and features will become more readily apparent from a review of the following specification when taken in conjunction with the drawings wherein:

FIG. 1 is an elevational view of the present invention;
FIG. 2 is a cross-sectional view of the centrifuge extractor of the present invention; and
FIG. 3 is an enlarged illustration of a portion of the extractor as shown in FIG. 2.

To accomplish the objects described above, the present invention is placed in the drainage system between the waste disposal and the rest of the system to remove sludge from the slurry discharge from the waste disposal. As illustrated in FIG. 1, sludge extratcor 10 is attached to the bottom of waste disposal 11 which may be of any type that is commercially available for attachment to drain 14 of basin 12 that just may be a common sink built into a counter such as might exist in a kitchen and similar utilitarian rooms.

In operations, waste is placed in drain 14 and water from spigot 13 is employed to wash the waste into waste disposal 11 for comminution. The resulting slurry of water and shredded waste particles is transported under the force of gravity through conduit 15 to sludge extractor 10 from which the sludge free liquid carrier is then discharged through a standard drain trap 16 to the sewage system. The extracted sludge is discharged into conduit 17 by the centrifugal action of sludge extractor 10 as will be more fully described below and from there into a sludge removal container 18 which in turn may be a part of a more complex sludge removing system as will be more thoroughly described below.

The manner in which the waste sludge is extracted from a slurry discharge from the waste disposal will now be described in reference to FIG. 2. As shown therein, sludge extractor 10 comprises perforated container 30 and helical conveyor 40, the latter being rotatably mounted within container 30 which is rotatably mounted within the housing of extractor 10. The cylindrical side wall of container 30 is provided with a plurality of apertures 31 which are distributed circumferentially completely throughout the side wall. Apertures 31 have a particular shape which is adapted to cooperate with the configuration of conveyor blade 40 in a manner that will be more thoroughly described below. Blade 40 is positioned within container 30 to be in sliding contact with the side wall thereof.

The side wall of container 30 is terminated at its top by an annular lip 32 which diverges outwardly and into annular port 37 of the extractor housing 10 for communication with conduit 17. To complete container 30, top panel 33 is provided and connected to the side wall of container 30 by top supports 34 which are circumferentially spaced along lip 32 to form a plurality of ports 38 that are adapted to receive the extracted sludge for a discharge into conduit 17.

Top panel 33 is provided with an annular port 36 for the reception of the slurry into container 30 while container 30 is rotating. For this reason, top panel 33 is divided into an inner portion and an outer portion which are connected together by a plurality of connecting spars 35.

Helical conveyor blade 40 is attached by a plurality blade supports 42 to drive shaft 41. Blade 40 is preferably formed of a spring steel so as to be urged into sliding contact with the side walls of container 30, and to this end, it is slidably mounted on the plurality of blade supports 42 although such mounting is not specifically illustrated in FIG. 2.

It will be understood by one skilled in the art that, by the very nature of a helical element, the application of a twisting torque to that element will cause a lessening of its radial diameter since the lenth of the helical element is fixed and yet the twisting torque will increase the number of turns of the element. Thus, helical blade 40 is to be loosely mounted on the plurality of blade supports 42 and the assembly is to be inserted into container 30 while a twisting torque is applied to the helical blade. Because of the elastic nature of the material of which blade is fabricated, the blade will tend to resume its normal position once the torque has been released and it will be understood that this elasticity of the spring material will serve to urge blade 40 into sliding contact with container 30.

Both container 30 and conveyor blade 40 are adapted to be driven in rotation at slightly different rotational speeds such that blade 40 will move upwardly in relation to a selected hypothetical vertical element of the side wall of container 30. To this end, drive shaft 41 is connected to a power source such as an electric motor which may just be electric motor 19 as shown in FIG. 1. This connection is preferably a direct connection to drive shaft 41 which is also employed to drive container 30 in rotation by way of a gear train comprising gears 44, 45, 46 and 47. Driving gear 47 is directly connected to drive shaft 41 while intermediate gears 45 and 46 are mounted to auxiliary shaft 48 and driven gear 44 is permanently attached to outer shaft 43 which is tubular in nature and adapted to receive drive shaft 41. Tubular shaft 43 is permanently affixed to top panel 33 of container 30 to impart a rotational motion to container 30.

In operations, helical conveyor blade 40 and perforated container 30 are driven in rotation by drive shaft 41 in a manner explained above with helical conveyor 40 rotating at a slightly faster speed such that the blade moves upwardly relative to container 30. This difference in rotational speed is achieved by appropriate selection of the diameters and number of teeth in the respective gears 44, 45, 46 and 47 as will be understood by one skilled in the art. Slurry is received from waste disposal 11 by way of conduit 15 as has been explained above for discharge through annular port 36 into container 30. The comminuted sludge particles and liquid which go to make up the slurry are forced against the side wall of container 30 by centrifugal action due to the rotation of container 30. The liquid carrier and microscopic particles of the sludge will be forced through the respective apertures 31 which have inner diameters small enough to retain sludge particles of any consequential size. Because of the relative motion between conveyor blade 40 and container 30, blade 40 will move upwardly in sliding contact with container 30 thereby raising the collected sludge filtrate up to the diverging lip 32 of container 30 where the sludge will be discharged through ports 38 by centrifugal action and into conduit 17 of extractor housing 10.

As illustrated in FIG. 1, the exracted sludge is then carried by force of gravity or by other means, as will be apparent to one skilled in the art, through conduit 17 to sludge collection container 18. The resulting filtrated liquid carrier is drained out of extratcor housing 10 by way of conduit 16 as illustrated in both FIGS. 1 and 2. It will be appreciated that the bottom of container 30 as illustrated in FIG. 2 should be provided with drainage ports (not shown) to allow for passage of liquid when the extractor is not in operation.

A particular feature of the present invention is the nonclogging, self-cleaning action of container 30 and self-sharpening action of conveyor blade 40 which will now be described in reference to FIG. 3. As shown therein, container side wall 30 is provided with a series of apertures 31, each of which tapers inwardly toward helical blade 40 and thus toward the axis of rotation of both container 30 and blade 40. The taper of apertures 31 is preferably 30 degrees with respect to the axis of each aperture although significant variation is tolerable and the inner or smaller diameter of each aperture 31 is preferably in the range between 0.05 inch and 0.005 inch depending upon the minimal sludge particle size required to be retained by the extraction system. The spacing between adjacent apertures is dependent upon the physical characteristics of the metal selected for the formation of container 30, that is to say that the apertures should be placed as closely together as possible without lessening the rigidity of the container structure. The metal selected should be of a type in which the respective apertures may be etched so as to reduce the time required for fabrication.

As further indicated in FIG. 3, the top and bottom surfaces of blade 40 are designed to flare outwardly from the axis of rotation of the blade so as to be in alignment with the corresponding top and bottom surfaces of the respective apertures 31. Thus, as blade 40 moves upwardly along the side wall of container 30, the top surface of blade 40 will be in alignment with the top surfaces of the respective apertures 31 and the bottom surface of blade 40 will be in alignment with the bottom surfaces of the respective apertures 31.

As has been pointed out above, blade 40 is preferably fabricated of a spring steel and assembled within container 30 so as to be urged into sliding contact with the side wall of container 30. Thus, should any sludge particles above a minimal size enter any of the respective apertures 31, the passage of blade 40 across that aperture will shear off that portion of the particle which protrudes out of the aperture and the remaining portion of the particle will be forced out of the aperture by the centrifugal action of the rotation of container 30. It will be apparent that any sheared particle that passes through an aperture in an above-described manner will be smaller than the minimal size required to be retained by the extractor.

In addition to the self-cleaning feature provided by the interaction between blade 40 and side wall of container 30, this interaction also provides a self-sharpening feature for both the edges of blade 40 and also for the edges forming the inner circumference of each of the respective apertures 31. This is particularly advantageous when the disposed waste comprises materials that are relatively hard and might cause nicks in both blade 40 and respective apertures 31. While the wearing down of the inner surface of the container side wall 30 will tend to increase the inner diameter of the respective apertures, such an increase will be relatively small depending upon the choice of the metal selected for the formation of the container side wall so as not to noticeably affect the operation of the extractor during its life time.

As thus described, a sludge extractor of the present invention is provided for compact arrangement with a waste disposal for convenient placement in the home beneath the sink of a kitchen or other utility room. To this end, the extractor which is of a centrifugal type is designed for attachment to the power source of the waste disposal and to have a common axis of rotation and even a common driving shaft when the waste disposal is of the rotary comminuting type. While the arrangement of FIG. 1 illustrates the placement of the power source and gear drive between the waste disposal and the sludge extractor, it will be understood by one skilled in the art that such a power source and gear drive may be placed beneath the sludge extractor with the driving shaft extending upwardly from the sludge extractor into the waste disposal and coupled to the main shaft of the disposal to provide power thereto.

While the description in relation to FIG. 1 has proscribed gravity flow to carry the slurry from disposal 11 to extractor 10, it will be appreciated that the centrifugal action of the disposal can provide a pumping effect on the slurry and, similarly, the centrifugal action of extractor 10 can provide a pumping effect on the sludge discharged into conduit 17 of FIGS. 1 and 2. To this end top supports 34 may be oriented at an angle with respect to the circumference of container 30 to provide a lateral motion to the sludge as it is discharged through ports 38 of FIG. 2.

As mentioned above, one advantage of the present invention is the reduction of the water content of waste to lessen the tendency for spoilage. It will be understood that the amount of water content in the extracted sludge will be edpendent on the cyclic or rotational speed of container 30 as well as the rate at which the sludge is removed from container 30 by helical conveyor 40. This rate in relation to the rotation of container 30 will be determined by the respective gear ratios of gears 44, 45, 46 and 47 of FIG. 2 and the rotational speed of container 30 can be varied by electrical control of the power source that drives shaft 41.

In addition to providing control of the power source, an electrical control system can be provided to allow the extractor unit to be in operation for a particular period of time before the power source is turned off so as to allow all comminuted waste to pass through the extractor.

In lieu of such controls, the rotational speed of container 30 can be preset by the manufacturer and the user of the present invention can be instructed to allow the extractor and disposal to run for a proscribed period of time after waste has been inserted into the disposal for comminution.

While FIG. 1 also merely illustrates the provision of a container to receive the extracted sludge, this container may be replaced by or coupled to an appropriate conveyor or conduit system. For example, in a high rise apartment building in a highly densely populated metropolitan area where the use of waste disposals is restricted, each apartment unit may be provided with a gravity conveyor outlet with a conduit connecting to a central sludge collection container in the basement of the building. In this situation, the apartment occupant can nevertheless install a waste disposal along with the present invention with conduit 17 of FIG. 1 being connected to the above-described outlet. In this manner, each apartment occupant can have all of the advantages of the waste disposal without adding any burden to the sewage system of the area and the extracted sludge need simply be removed from the central sludge receiving container by the maintenance people of the apartment building.

The present invention, as thus described, provides for the enjoyment of the advantages of a home waste disposal without increasing the burden placed on local sewage systems and without increasing the pollution problem that currently exists in metropolitan centers as well as in rural areas.

While one embodiment of the present invention has been described, it will be apparent to those skilled in the art, that changes and modifications may be made therein without departing from the spirit and scope of the invention as claimed.

What is claimed is:

1. A waste disposal system for employment with a sink having a source of water and a drain conduit, said sink including a basin adapted to receive water and provide with a drain aperture in the bottom portion thereof, said system comprising:
   a waste disposal apparatus of the rotating comminuting type adapted to be mounted below said basin and connected in communication with said drain aperture to receive water and waste products for a comminution into a slurry;
   means to mount said apparatus underneath said basin and in communication with said aperture;
   a rotary sludge extractor centrifuge adapted to be mounted below said disposal apparatus and coupled in communication with said apparatus to receive said slurry for extraction therefrom of sludge formed of comminuted waste products, said centrifuge being provided with a port for communication with said drain conduit; and
   means to mount said centrifuge underneath said apparatus in communication therewith.

2. A waste disposal system according to claim 1 wherein:
   said rotary disposal apparatus and said rotary centrifuge are mounted with a common axis of rotation.

3. A system according to claim 2 including:
   a rotatable shaft mounted on said common axis; and
   a power source coupled to said shaft;
   said disposal apparatus and said centrifuge being mounted around said shaft and adapted to be driven thereby.

4. A system according to claim 3 wherein said centrifuge includes:
   a rotatable cylindrical container mounted on said shaft; and
   a rotatable helical conveyor mounted on said shaft and within said container and urged into sliding contact with the cylindrical wall of said container.

5. A system according to claim 4 wherein:
   said coveyor and said container are coupled to said shaft so as to rotate at different rotational speeds such that the conveyor acts to move said sludge upwardly for expulsion from said container.

6. A system according to claim 5 wherein:
   said centrifuge is provided with a discharge conduit; and said container is provided with ports within said cylindrical container wall and adjacent the top thereof to receive sludge from said helical conveyor for discharge into said conduit;

said conduit being aligned wtih said ports.

7. A system according to claim 5 wherein:

said container is provided with a plurality of apertures distributed throughout said cylindrical wall, said apertures being tapered inwardly toward said axis of rotation at a particular angle; and said helical conveyor comprises a blade having opposed surfaces that are flared outwardly away from said axis of rotation at an angle equal to said particular angle.

8. In a waste disposal system having sludge extractor adapted to remove sludge from a slurry formed of water and comminuted waste products, said extractor comprising:

a rotary centrifuge having a cylindrical container mounted for rotation; and a rotary helical conveyor mounted within said container and adapted to be driven at a rotational speed different from that of said container;

said container including a cylindrical wall provided with a plurality of apertures distributed there throughout, said apertures being tapered inwardly toward its axis of rotation at a particular angle; and said helical conveyor including a blade having opposed surfaces flared outwardly at an angle the sme as said particular angle.

said helical conveyor including a blade having opposed surfaces flared outwardly at an angle the same as said particular angle.

9. A system according to claim 8 wherein said blade is mounted within said containera nd urged into sliding contact therewith.

References Cited

UNITED STATES PATENTS

| | | | |
|---|---|---|---|
| 617,158 | 1/1899 | Henderson | 210—374 |
| 1,030,169 | 6/1912 | Emery | 241—62X |
| 1,655,426 | 1/1928 | Lauglin | 210—374 |
| 2,114,778 | 4/1938 | Fillinger | 210—374 |
| 2,594,635 | 4/1952 | Gamaunt | 241—88 |
| 2,991,018 | 7/1961 | Jenkins | 241—46X |
| 3,375,776 | 4/1968 | Dyson | 241—46X |

DONALD G. KELLY, Primary Examiner

U.S. Cl. X.R.

209—301; 210—374; 241—46.08, 85, 162